United States Patent [19]

Matsui

[11] Patent Number: 4,704,510

[45] Date of Patent: Nov. 3, 1987

[54] CONTAINERS FOR FOOD SERVICE

[75] Inventor: Takashi Matsui, Nara, Japan

[73] Assignee: Fukuyama Pearl Shiko Kabushiki Kaisha, Hiroshima, Japan

[21] Appl. No.: 823,848

[22] Filed: Jan. 29, 1986

Related U.S. Application Data

[63] Continuation of Ser. No. 611,767, May 18, 1984, abandoned.

[30] Foreign Application Priority Data

Jun. 3, 1983 [JP] Japan .................................. 58-85251
Jul. 14, 1983 [JP] Japan ................................ 58-109954
Aug. 27, 1983 [JP] Japan ................................ 58-132357

[51] Int. Cl.$^4$ .............................................. H05B 6/80
[52] U.S. Cl. .............................. 219/10.55 E; 426/243;
99/DIG. 14; 206/523; 220/902
[58] Field of Search ................... 219/10.55 E, 10.55 F;
426/241, 243, 234, 107, 113; 126/390; 99/DIG.
14; 206/557, 523; 220/902

[56] References Cited

U.S. PATENT DOCUMENTS

| 3,271,169 | 9/1966 | Baker et al. |
| 3,468,468 | 9/1969 | Foote .............................. 206/557 X |
| 3,965,323 | 6/1976 | Forker, Jr. et al. ......... 219/10.55 E |
| 4,008,347 | 2/1977 | Amberg et al. ................. 220/902 X |
| 4,183,435 | 1/1980 | Thompson et al. |
| 4,184,061 | 1/1980 | Suzuki et al. ................. 219/10.55 E |
| 4,272,475 | 6/1981 | Chi . |
| 4,337,116 | 6/1982 | Foster et al. ............. 219/10.55 E X |

FOREIGN PATENT DOCUMENTS

| 0043206 | 1/1982 | European Pat. Off. . |
| 2279534 | 2/1976 | France . |
| 2318082 | 2/1977 | France . |
| 57-12228 | 1/1982 | Japan ........................... 219/10.55 E |
| 974445 | 7/1963 | United Kingdom . |
| 1426077 | 2/1976 | United Kingdom . |
| 1554438 | 10/1979 | United Kingdom . |
| 2118918 | 11/1983 | United Kingdom . |

OTHER PUBLICATIONS

Technology News, "Thermoforming of Ovenable PET Trays Now is Economically Viable", Plastics Technology, Nov. 1983.
Hanlon, "Handbook of Package Engineering", McGraw-Hill Inc. © 1971, Section 3, pp (3-1 to 3-9).

Primary Examiner—Philip H. Leung
Attorney, Agent, or Firm—Beveridge DeGrandi & Weilacher

[57] ABSTRACT

A food packaging container which can withstand heating in a microwave oven. It is formed of a laminate sheet material comprising a non-stretched polyethylene terephthalate film or sheet laminated on the interior side of a foamed sheet.

6 Claims, 9 Drawing Figures

CONTAINERS FOR FOOD SERVICE

REFERENCE TO A RELATED APPLICATION

This application is a continuation of copending application Ser. No. 611,767 filed May 18, 1984, now abandoned, which is relied on and incorporated by reference.

BACKGROUND OF THE INVENTION

This invention relates to containers and more particularly to thermoplastic resin-made containers for food service.

Hitherto, containers made of various different types of material have been developed for food service. For example, in order to provide good heat insulation, containers are formed of a foamed polystyrene sheet material. Such container is most typically used as a handy container for instant food service or the like.

With all its good heat insulation performance, however, such polystyrene sheet-made container does not well withstand heating in a microwave oven and will be easily deformed in a short time when subjected to such heating. As such, it can hardly be qualified as a heat-resisting container for use under microwave heating.

For containers other than those of the foamed polystyrene sheet type, research and development efforts have been made in an attempt to provide them with good heat resistance. In the present state of the art, there are available heat-resisting containers formed of non-foamed sheet materials and which are claimed to withstand microwave oven heat. However, these containers have no sufficient heat insulation or heat retention performance; when removed from the oven, some of them may feel too hot, and some other is such that its contents may get cold in a very short time. As such, from the standpoint of serviceability, they are not well suitable for use with microwave ovens.

In view of such situations, the present inventor made an attempt to form a container by laminating a polycarbonate resin film or sheet on the interior-side surface of a foamed polystyrene sheet in order to provide the container with heat resisting properties while best utilizing the heat insulating properties of the foamed polystyrene sheet. It was found that while such lamination was possible, the sheets laminated together could not be formed into a container (by a sheet forming technique such as vacuum forming or air-pressure forming) because of there being a great difference in temperature resistance between foamed polystyrene and polycarbonate resin. So, this attempt was unsuccessful after all.

After further efforts directed toward the development of a container having good serviceability under microwave heat conditions, the inventor came up with an idea that it might be possible to form a container from a laminated-sheet prepared so that a polyethylene terephthalate film or sheet is present on the interior surface of a foamed polystyrene sheet, when the container is formed. However, if a prestretched polyethylene terephthalate film or sheet of ordinary type is laminated on a foamed polystyrene sheet, there is a difficulty that when the laminated sheet is formed into a container, the greater the draw ratio, the greater would be the stretching due to drawing of the peripheral wall portion, with the result of the thickness of some peripheral wall portion being reduced disproportionally to the other wall portion. It follows that the container would have a portion excessively weakened due to such wall thickness reduction. Further, it was found that if subjected to microwave heat conditions, such container would be liable to considerable deformation because the prestretched polyethylene terephthalate film or sheet would tend to return to its original state, which fact practically denies the serviceability of the container for use with a microwave oven.

BRIEF SUMMARY OF THE INVENTION

Accordingly, this invention has as its object the provision of a container which can well withstand heating in a microwave oven.

The container in accordance with the invention is characterized in that it is formed of a laminate sheet material comprising a foamed sheet and a non-stretched polyethylene terephthalate film or sheet laminated on the interior side of the foamed sheet.

The container is formed chiefly of the foamed sheet, so that it has excellent heat-resisting, shock-absorbing, and light-weight properties. Further, the non-stretched polyethylene terephthalate film or sheet laminated on the interior side of the foamed sheet, i.e., the interior surface of the container that comes in direct contact with a foodstuff when placed therein, provides much greater heat- and oil-resistance. More particularly, when the container with food contained therein is heated in a microwave oven, it will exhibit good serviceability without being liable to deformation due to heat from the heated food.

Therefore, the container of the invention is suitable for use as a container for any ordinary food or frozen food, for example, in cooking the food in the microwave oven. Since it is not liable to deformation, the container, after cooking, may be advantageously used as a handy cup or bowl as it is.

The improved heat resistance of the container permits the container to be conveniently used for serving various types of heated food, in addition to its use as a container for the purpose of microwave oven cooking.

Furthermore, the fact that the non-stretched polyethylene terephthalate component has good heat-resisting, oil-resisting, and gas-barrier properties assures good serviceability of the container for use in storing food.

DETAILED DESCRIPTION OF THE DRAWINGS

FIGS. 6 [a] to 6 [d] are plan views showing various ways of arrangement of experimental containers on a turntable in the microwave oven;

FIGS. 7 [a] to 7 [h] are plan views showing experimental containers arranged on the turntable according to each particular size of container as assumed;

FIGS. 8 [a] to 8 [h] (except 8 [g]) are schematic views in section showing only the raised bottom configurations of the individual assumed containers as taken on lines a—a' . . . h—h' in FIGS. 7 [a] to 7 [h]

DETAILED DESCRIPTION

Figure 1:
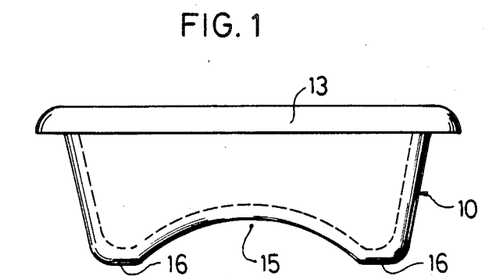
FIG. 1 is a front view illustrating a container representing one embodiment of the invention.
Figure 2:
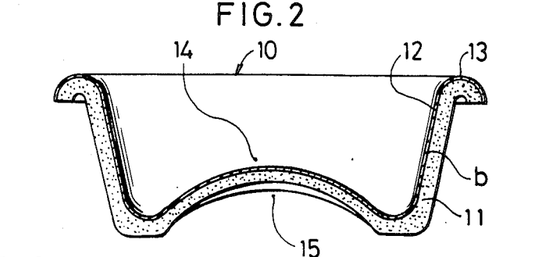
FIG. 2 is a sectional view thereof.
Figure 3:
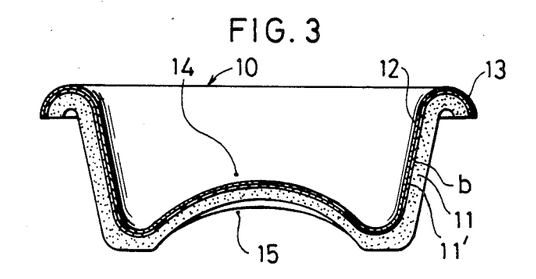
FIGS. 3 and 4 are sectional views showing containers in modified forms.
Figure 4:
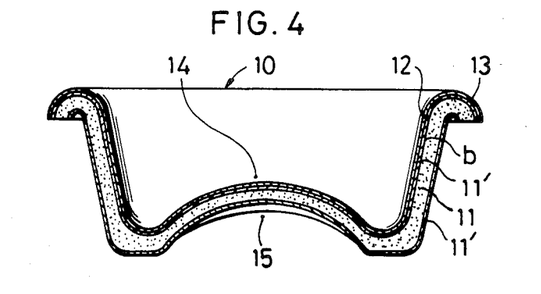

Referring first to FIGS. 1 and 2, numeral 10 generally designates a container in accordance with this invention, and numeral 11 designates a foamed sheet layer such as foamed polystyrene sheet which constitutes a principal material component of the container. Shown by 12 is a non-stretched polyethylene terephthalate film or sheet layer laminated on the interior side of the foamed sheet layer 11 or the interior of the container to provide heat resisting capabilities, the former layer being laminated on the latter by thermal adhesion or through the intermediary of a bonding layer (b) comprising a binder. Numeral 14 is a bottom portion having a configuration of an upwardly arcuate raised bottom pattern as will be described hereinafter, preferably with its center raised most conspicuously. Designated by 15 is a hollow formed on a portion of the bottom-side circumferential area of the container and along the arcuate raised bottom configuration. Numeral 16 is a leg-like portion defined by the gouge 15. In FIG. 2, the foamed polystyrene sheet constituting the foamed sheet layer 11 is shown as a single layer, but in order to provide improved printability or reinforcement, one having a non-foamed and non-stretched polystyrene film 11' or sheet laminated on one or both sides thereof may be used instead (see FIGS. 3 and 4). Especially where such laminated layer is used as a foamed polystyrene sheet layer, it is more convenient from the standpoint of manufacturing operation to prepare in advance a laminate of a nonstretched polyethylene terephthalate film or sheet layer 12 with a non-foamed and non-stretched polystyrene film or sheet 11', both bonded together through the intermediary of a bonding layer (b) comprising a binder, and to laminate a foamed polystyrene sheet 11 thereon, then forming the resulting laminate into a container.

In order to provide a container having the above described construction in accordance with the invention, a non-stretched polyethylene terephthalate film or sheet is laminated on a foamed sheet such as foamed polystyrene sheet or the like, then the laminated sheet so obtained is preheated before it is sheet-formed into a container by vacuum forming or pressure forming or the like. It is noted that during forming operation, particular care should be used with respect to the non-stretched terephthalate film or sheet which requires low temperature forming; and in this connection, forming operation should be carried out at as low temperatures as possible because crystallization of the film or sheet, if such develops, may easily lead to unsatisfactory forming. After formed, the container is preferably heat treated (at more than 110° C.), for crystallization, by passing it through a heated atmosphere (e.g. passage through an oven or the like). Such treatment is desirable from the viewpoint of heat resistance, because it will render the material of the container unliable to crystallization during the use of the container for heating service in a microwave oven. The foamed polystyrene sheet material is suitably 0.7~2.5 mm thick, and the polyethylene terephthalate film is suitably $25\mu \sim 100\mu$ thick. In some cases, such film or sheet having greater thickness may be used.

As a heat-resisting container, the container 10 has a general configuration preferably such that its rim portion 13 is bead-shaped, witht he polyethylene terephthalate layer 12 extending over said bead-shaped portion. However, the container is not limited to such configuration; various other configurations, such as square, round, and ellipsoidal, may be employed. Also, the thickness of each individual layer may be modified in various ways according to the type of food to be packed in the container.

For the foamed sheet layer 11, use of a foamed polystyrene sheet is most preferable from the viewpoints of usability factors such as heat insulation, rigidity and strength, as well as processability and material cost. Beside polystyrene, however, thermoplastic resin foamed sheet materials such as foamed polypropylene sheets, which are conventionally used as container materials, may be used.

Nextly, the results of the experiments conducted to clarify the reason why the bottom configuration of arcuate raised pattern is preferred in working the present invention will be presented.

Figure 5:
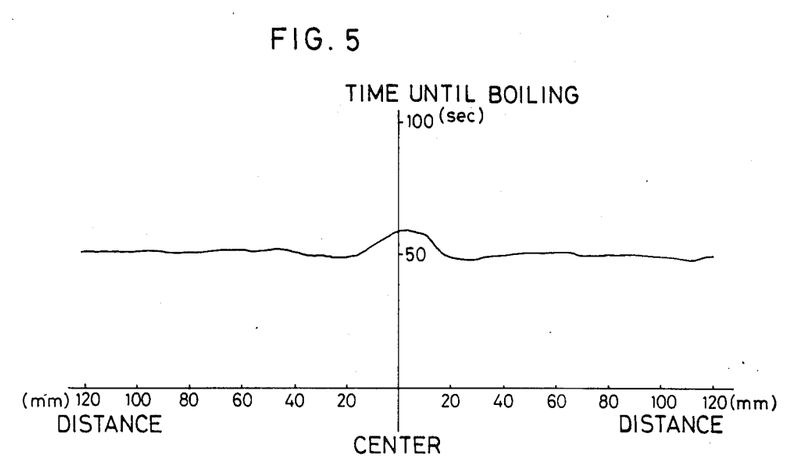
FIG. 5 is a graphic representation showing the results of tests conducted on the characteristics of a microwave oven, with experimental containers arranged therein, to prove the advantages of the invention.

First, to examine the characteristics of the microwave oven employed (output 600 W), polypropylene-made miniature cylindrical containers, each 50 mm deep, (hereinafter referred to as experimental containers), each containing 34 ml of water (water temperature 25° C. at room temperature 25° C.), were arranged on the turntable in the microwave oven, at 20 mm pitch over a distance of 120 mm from the center of the turntable, and measurement was made as to the period of time elapsed until the water got boiled. As FIG. 5 shows, the center position on the turntable seemed to be slightly less sensitive to heating and a position 20 mm apart from the center seemed to be slightly more sentitive to heating; it was found, however, heating was almost uniform at all locations. Presumably there may be some variations depending upon the type or model, though.

Figure 6:
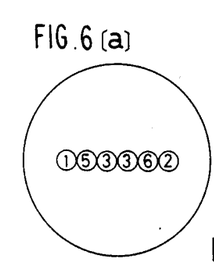
Figure 7A:
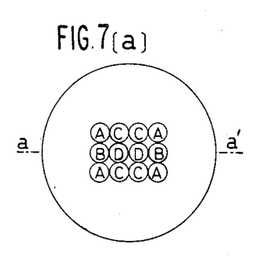
Figure 7B:
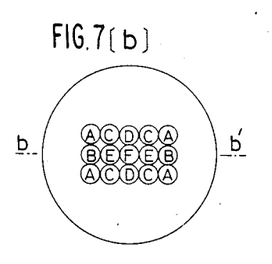
Figure 7C:
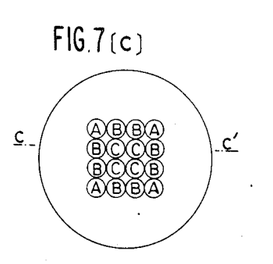
Figure 7D:
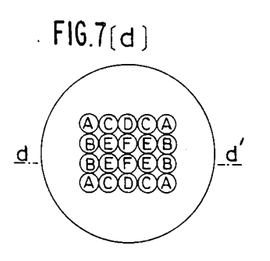
Figure 7E:
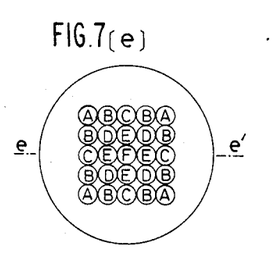
Figure 7F:
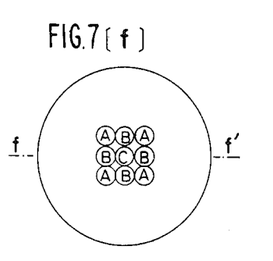
Figure 7G:
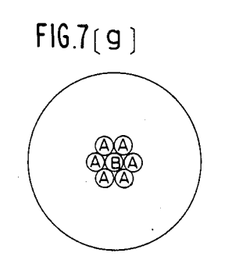
Figure 7H:
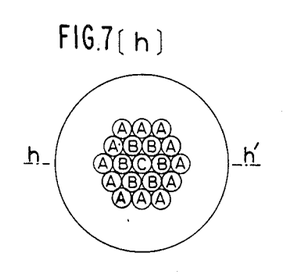

Then, with the arrangement of the experimental containers changed as shown in FIGS. 6 [a to 6 [d], tests were made several times to see if the condition of heating might vary. Average periods of time taken until boiling were:

|     | (in sec) |
| --- | --- |
| [a] | 183 |
| [b] | 168 |
| [c] | 170 |
| [d] | 148 |

In the case of [d], where the individual containers were less liable to interference from one another, the heating time required was smaller than in the other cases and less variation was involved. Longer heating time and a greater degree of variation were found with the case of [a] where the containers were arranged in a straight line. In cases [b] and [c], the results were nearly same and more favorable than those in case [a]. From these tests it was found that though the water content was same with all the containers, the condition of heating varied according to the container configuration (arrangement of experimental containers).

Nextly, various actual container configurations and sizes were assumed, and on the basis of the assumption, the arrangement of experimental containers was varied as shown in FIG. 7 [a] to 7 [h]. The conditions of heating at different positions were tested in terms of average times required for boiling.

| Anticipated container sizes: | | | |
|---|---|---|---|
| Fig. | (Length) | (Width) | (Depth) |
| [a] | 124 × | 93 × | 50 mm |
| [b] | 155 × | 93 × | 50 |
| [c] | 124 × | 124 × | 50 |
| [d] | 155 × | 124 × | 50 |
| [e] | 155 × | 155 × | 50 |
| [f] | 93 × | 93 × | 50 |
| [g] | 93 (diameter) | | × 50 |
| [h] | 155 (diameter) | | × 50 |

(Unit: sec)

| | Anticipated Container | | | | | | | |
|---|---|---|---|---|---|---|---|---|
| Position | [a] | [b] | [c] | [d] | [e] | [f] | [g] | [h] |
| A | 233 | 278 | 283 | 358 | 470 | 208 | 202 | 428 |
| B | 312 | 342 | 395 | 447 | 625 | 235 | 177 | 577 |
| C | 345 | 418 | 513 | 500 | 645 | 250 | — | 630 |
| D | 370 | 435 | — | 540 | 800 | — | — | — |
| E | — | 510 | — | 670 | 825 | — | — | — |
| F | — | 470 | — | 647 | 820 | — | — | — |

According to the test results shown above:

Case [a] (see FIG. 8 [a])

Figure 8A:
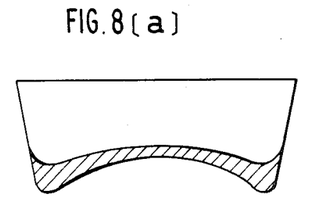

It can be seen that locations most remote from the center of the container are most sensitive to heating, with container side areas coming next, followed by the center location.

Now, if the container is to be uniformly heated at all portions thereof, it is necessary to adjust the depth thereof. Theoretically, heating time is directly proportional to the amount of water. so, the quantity of heat required for 34 ml of water to be boiled is:

$$34 \text{ ml} \times (100° \text{ C.} - 23° \text{ C.}) = 2618 \text{ cal}$$

For the purpose of calculation, positions A and D are taken by way of example. At position A, water was boiled in 233 sec. So, $$2618/233 = 11.24 \text{ (cal/sec)}$$

At position D, water was boiled in 370 sec. So, $$2618/370 = 7.08 \text{ (cal/sec)}$$

The amount of water required at D for boiling in 233 sec is:

$$Q = 7.08 \times 233/(100 - 23) = 21.4 \text{ ml}$$

Accordingly, if the amount of water at D is 21.4 ml, water at D will become boiled at same time as at A.

It follows that if the depth at D is 63% of that at A, or in other words, if the bottom of A is raised 37%, boiling at D will take place at same time with boiling at A. (Strictly speaking, however, it is necessary to raise the bottom slightly more, allowing for the effect of the thermal efficiency of the microwave oven relative to the container and of the thermal capacity of the experimental containers.) Similarly, with a at 0%, necessary degrees of bottom raising at other positions are calculated as follows:

| Position | Degree of bottom raising (%) | Actual depth (mm) |
|---|---|---|
| A | 0 | 50 |
| B | 25 | 37.5 |
| C | 32 | 34 |
| D | 37 | 31.5 |

The resulting decrease in the container capacity is 21%.

Case [b] (see FIG. 8 [b])

Figure 8B:
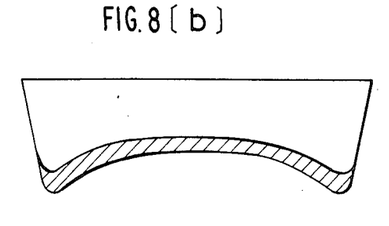

A tendency similar to that seen with case [a] was observed. At E and F, indications are in slightly reverse relation, but no particular problem is considered. To equalize the boiling times as in case [a, the bottom may be raised as follows:

| Position | Degree of bottom raising (%) | Actual depth (mm) |
|---|---|---|
| A | 0 | 50 |
| B | 19 | 40.5 |
| C | 33 | 33.5 |
| D | 36 | 32 |
| E | 45 | 27.5 |
| F | 41 | 29.5 |

The resulting decrease in the container capacity is 25%.

Case [c] (see FIG. 8 [c])

Figure 8C:
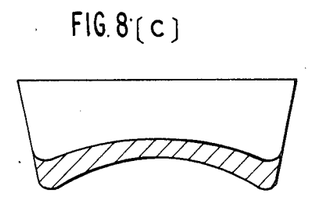

A similar tendency was observed in the case of the square configuration as well.

The bottom may be raised in the following manner.

| Position | Degree of bottom raising (%) | Actual depth (mm) |
|---|---|---|
| A | 0 | 50 |
| B | 28 | 36 |
| C | 45 | 27.5 |

The resulting decrease in the container capacity is 25%.

Case [d] (see FIG. 8 [d])

Figure 8D:
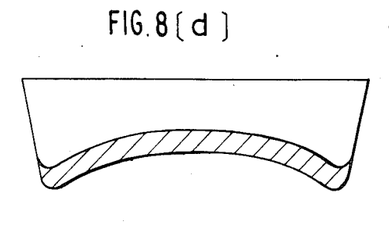

The tendency here was similar to that seen in case [b].

| Position | Degree of bottom raising (%) | Actual depth (mm) |
|---|---|---|
| A | 0 | 50 |
| B | 20 | 40 |
| C | 28 | 36 |
| D | 34 | 33 |
| E | 47 | 26.5 |
| F | 45 | 27.5 |

As a result, the container capacity is reduced to 27%.

It is noted that the larger the container, the greater is the decrease in the container capacity.

Case [e] (see FIG. 8 [e])

Figure 8E:
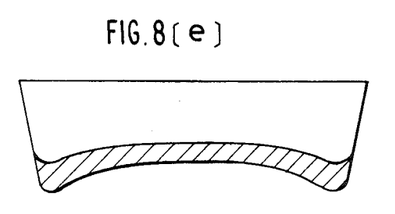

A similar tendency was seen here, too.

| Position | Degree of bottom raising (%) | Actual depth (mm) |
|---|---|---|
| A | 0 | 50 |
| B | 25 | 37.5 |
| C | 27 | 36.5 |
| D | 41 | 29.5 |
| E | 43 | 28.5 |

| Position | Degree of bottom raising (%) | Actual depth (mm) |
|---|---|---|
| F | 43 | 28.5 |

The resulting decrease in the container capacity is 27 %.

Case [f] (see FIG. 8 [f])

Figure 8F:
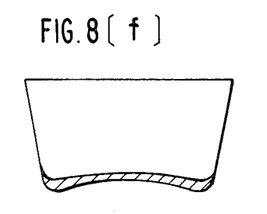

A similar tendency was observed in this case as well.

| Position | Degree of bottom raising (%) | Actual depth (mm) |
|---|---|---|
| A | 0 | 50 |
| B | 11 | 44.5 |
| C | 17 | 41.5 |

The resulting decrease in the container capacity is 7 %, which is very much smaller as compared with cases [c] and [e].

Figure 8G:
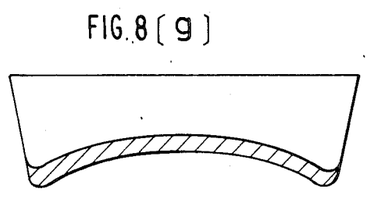

Case [g] (not shown)

Tests were made with a small round configuration anticipated. In this case, boiling began at the center position. This means that there is no much need for bottom raising. Accordingly, content reduction is little required, if any. The measurements showed no much variation and stable boiling was observed.

Case [h] (see FIG. 8 [h])

Here too, tests were made with a round configuration. In this case, however, boiling started at positions remote from the center.

This difference from case [g] is considered to be attributable to the difference in diametral size (container size). Uniformity in boiling may be obtained by raising the bottom in the following way:

| Position | Degree of bottom raising (%) | Actual depth (mm) |
|---|---|---|
| A | 0 | 50 |
| B | 26 | 37 |
| C | 32 | 34 |

The required content reduction is 10%, which is considerably small as compared with cases [e] and [c].

On the basis of the test results with cases [a]~[h], thermal efficiency (the quantity of heat absorbed by water per second for the container as a whole) was calculated as follows:

| Position | Content reduction due to bottom raising (%) | Thermal efficiency (cal/sec) |
|---|---|---|
| [a] | 21 | 103 |
| [b] | 25 | 101 |
| [c] | 25 | 106 |
| [d] | 27 | 102 |
| [e] | 27 | 98 |
| [f] | 7 | 105 |
| [g] | 0 | 92 |
| [h] | 10 | 99 |

From the viewpoint of thermal efficiency, there is no much difference between the individual cases. (It is not practicable to compare the round configurations with the square or rectangular configurations, because the arrangements are basically different therebetween.) This means that heat absorption takes place regardless of configuration.

Referring to content reduction due to bottom raising, it is apparent that configurations [f], [g] and [h] have a good advantage over the other configurations. This is attributable to the fact that a round or small configuration needs only a simple and small-scale bottom raising, whereas a square or large configuration requires a substantial degree of bottom raising.

One tendency can be seen from FIG. 8.

Variations between positions in the required bottom raising are relatively small at locations adjacent the center and progressively substantial at locations adjacent the edge portions.

This is shown in FIGS. 8A–8F wherein the line indicated by $L_1$ represents the bottom profile of the container taken along the respective section lines a—a' ... h ... h' as shown in FIG. 7. The line indicated by $L_2$ represents the profile of the bottom of the container adjacent the edge portion of the container. In Figure 8[g], the lines $L_1$ and $L_2$ are coincident because there is no section taken through FIG. 7[g].

On the basis of this finding, it is considered that a suitable raised bottom should have an upwardly arcuate configuration.

As a supplementary arrangement in this connection, it is desirable that in order to facilitate visual attention to the raised bottom, a hollow portion extending along the arcuate raised configuration should be provided on the bottom adjacent the edge of the peripheral side wall.

Further, it is desirable that the circumferential configuration should be rather upright, as close to right angle as possible, because a loose taper may mean less capacity of the container on the edge side.

Figure 9:
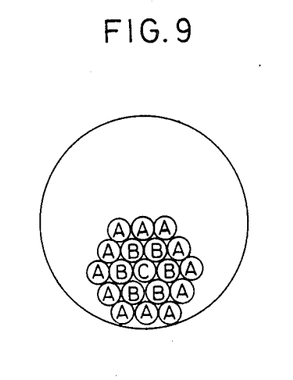
FIG. 9 is a top plan view showing experimental containers arranged with their position shifted off the center of the turntable.

In the above described tests, it is assumed that a container or containers are placed at the center of the turntable in the microwave oven. Tests were made to see what would happen if a container is placed adjacent the edge of the turntable as shown in FIG. 9.

Experimental containers were arranged on the assumption that a container of the same configuration as the aforesaid [h]. Average times taken until boiling were as follows:

| | (sec) |
|---|---|
| A | 460 |
| B | 555 |
| C | 670 |

As can be seen from these boiling times if compared with those in other cases of arrangement, no particular difference in tendency was observed.

The bottom may be raised as follows:

| Position | Degree of bottom raising (%) | Actual depth (mm) |
|---|---|---|
| A | 0 | 50 |
| B | 17 | 41.5 |
| C | 31 | 34.5 |

Capacity reduction 7%
Thermal efficiency 99 cal/sec

These figures show a slight advantage over those in the earlier mentioned cases. In thermal efficiency, there is no particular difference between the center and the remote portions.

As can be appreciated from these figures, it is evident that the tendency that portions remote from the center of the container are more sensitive to heating holds true irrespective of the position of the container on the turntable, center or peripheral.

Therefore, it can be concluded that the heating of contents of the container is influenced by the container configuration rather than the position of the container.

The above test results may be summarized as follows:

1. Where a microwave oven is employed, the heating of the contents of a container is largely influenced by the configuration of the container.

2. The heating of the contents is not appreciably influenced by the position of the container on the turntable.

3. The contents tend to be heated in order of corner portion→peripheral side portion→center portion.

4. Heating effect can be equalized by changing the bottom configuration of the container (bottom raising).

5. A round or small configuration is desired.

6. The taper in the container is desirably upright as far as possible.

7. The configuration of the raised bottom is preferably of arcuate section.

The container in accordance with this invention comprises a foamed sheet layer 11, preferably a foamed polystyrene layer, as principal material, and a non-stretched polyethylene terephthalate film or sheet layer 12 laminated on the interior side of the former layer, that is, the interior side of the container that comes in direct contact with the contents. Constructed as such, the container of the invention has excellent heat insulation and shock absorbing properties, lightweight, rigidity, and formability; in addition, it has good water- and oil-resistance, gas barrier properties, and heat resistance. With food as contained therein, the container can be conveniently used for heating service in a microwave oven, without being liable to deformation. It has a great advantage over conventional containers in that it exhibits excellent heat-resisting performance, when heated in the microwave oven. Therefore, the container of the invention can be used as a cooking container for ordinary food or frozen food, for example, in the microwave oven. Since it is not liable to deformation, after cooking service, the container can be conveniently used as a handy bowl or dish.

Preferably, the container is heat treated for ignition or crystallization, prior to its use for heating service in the microwave oven. By given this treatment is it possible to further improve the heat resistance of the container, because it is no longer liable to ignition or crystallization when subjected to heating in the oven.

Further, the container preferably has a raised bottom of an upward arcuate section. By using such container, it is possible to heat the contents and more particularly viscous contents (such as gratin, stew, sweet- and sour-pork, and curry) and granular contents (such as processed rice) uniformly all over and with greater thermal efficiency.

The fact that the container of the invention has a good formed effect (which is well obtainable by vacuum forming with female mold only) and that it can be effectively used as a container for heating service in a microwave oven was evidenced by the following test results as well.

With respect to containers according to the invention, as formed by four different draw ratio=depth/diameter with a diameter of 12 cm, and each of which comprises a foamed polystyrene sheet layer of about 200 g/m$^2$ with non-foamed and non-stretched polystyrene film layers of about 20$\mu$ laminated on both sides thereof, and a non-stretched polystylene terephthalate film layer, 100$\mu$ thick, laminated on the interior side of the first mentioned layer, data were prepared as to the case where a female mold only was used in vacuum forming and the case where a female and male mold was employed in vacuum forming. Also, data were prepared as to the results of heating these containers, with food (sweet- and sour-pork) contained therein and wrapped, in a microwave oven. For the purpose of comparison, reference containers, wherein a stretched polyethylene terephthalate film was used instead of non-stretched polyethylene terephthalate film, were prepared. The results of the comparison are as follows:

TABLE 1

| | | (Forming Results) | | | |
|---|---|---|---|---|---|
| | | Kind | | | |
| | | Reference Container | | Container of the Invention | |
| | | Forming method | | | |
| Draw ratio | Form-ability | Female | Female & male | Female | Female & male |
| 0.1 | Judgement | Δ | | | |
| | Observation | Interior bottom round | No problem | No problem | No problem |
| 0.2 | Judgement | Δ | | | |
| | Observation | Interior bottom round | Crease on edge portion | No problem | No problem |
| 0.3 | Judgement | X | Δ | | |
| | Observation | Large crease at bottom | Crease on edge portion | No problem | No problem |
| 0.4 | Judgement | X | Δ | | |
| | Observation | Large crease at bottom; PSP separate from PET | Large crease on edge portion | No problem | No problem |

PSP: foamed polystyrene sheet
PET: polyethylene terephthalate
Deformation symbols
 : No deformation
Δ: Slight deformation
X: Deformation considerable

TABLE 2

(Heating Result)

| Draw ratio | Content | Heating time | Post-heating condition | Reference Container Female | Reference Container Female & male | Container of the Invention Female | Container of the Invention Female & male |
|---|---|---|---|---|---|---|---|
| 0.1 | 100 g | 1 m 30 sec | Deformation Surface erosion | No change | No change | No change | No change |
| 0.2 | 150 g | 2 m 15 sec | Deformation Surface erosion | Δ PSP separate from PET at bottom corner | X No change | No change | No change |
| 0.3 | 200 g | 3 m 00 sec | Deformation Surface erosion | X PSP separate from PET at bottom corner | X No change | No change | No change |
| 0.4 | 250 g | 3 m 45 sec | Deformation Surface erosion | X PSP separate from PET at bottom corner | X No change | No change | No change |

PSP: foamed polystyrene sheet
PET: polyethylene terephthalate
Deformation symbols
 No deformation
Δ Slight deformation
X Deformation considerable

What is claimed is:

1. A container for food service capable of withstanding heating in a microwave oven comprising a bottom wall portion and a peripheral side wall portion, said bottom portion having an upwardly arcuate configuration in cross section and being connected to said side portion, there being a leg-like portion defined by the bottom portion which joins the peripheral side wall portion, said container being formed of a laminated sheet comprising at least one foamed layer of polystyrene and at least one layer of crystallized polyethylene terephthalate film, said polyethylene terephthalate film being laminated on said foamed sheet on the surface of said foamed sheet which forms the interior of said container, the polyetylene terephthalate film being formed from non-stretched polyethylene terephthalate film, said polyethylene terephthalate film having a crystal structure formed during a crystallization period, with said crystal structure having substantially the same characteristics as that of a non-stretched polyethylene terephthalate film in a polyethylene terephthalate film/polystyrene lamination having been subjected to a low temperature, non-crystallization container forming process and subsequent heat treatment at more than 110° C.

2. The container according to claim 1 wherein the side wall has a rim portion which is bead shaped and wherein the polyethylene terephthalate layer extends over said bead shaped rim portion.

3. A container for food service comprising a bottom wall portion and a peripheral side wall portion, said bottom wall having an upwardly arcuate raised bottom pattern, an internal surface provided in said container, wherein said bottom wall portion and said side wall are formed of a foamed polystyrene sheet and crystallized polyethylene terephthalate film, said crystallized polyethylene terephthalate film being integrally laminated onto said foamed polystyrene sheet so that the said polyethylene terephthalate film is on the internal surface of said container, said crystallized polyethylene terephthalate film being formed from non-stretched polyethylene terephthalate film, said polyethylene terephthalate film having a crystal structure formed during a crystallization period, with said crystal structure having substantially the same characteristics as that of a non-stretched polyethylene terephthalate film in a polyethylene terephthalate film/polystyrene lamination having been subjected to a low temperature, non-crystallization container forming process and subsequent heat treatment at more than 110° C.

4. The container according to claim 3 wherein a monolayer foamed polystyrene sheet is used as said foamed polystyrene sheet.

5. The container according to claim 3 wherein the foamed polystyrene sheet comprises a plurality of non-stretched foamed polystyrene sheets.

6. The container according to claim 3 wherein the center of the bottom wall portion is raised to define a hollow on the bottom-side circumferential area of the container.

* * * * *